(12) United States Patent
Bastien et al.

(10) Patent No.: US 12,117,465 B2
(45) Date of Patent: Oct. 15, 2024

(54) AUTOMATIC PHASE OFFSET CALCULATION

(71) Applicant: Allegro MicroSystems, LLC, Manchester, NH (US)

(72) Inventors: Solène Bastien, Annecy (FR); Andreas P. Friedrich, Metz-Tessy (FR)

(73) Assignee: Allegro MicroSystems, LLC, Manchester, NH (US)

( * ) Notice: Subject to any disclaimer, the term of this patent is extended or adjusted under 35 U.S.C. 154(b) by 236 days.

(21) Appl. No.: 17/217,274

(22) Filed: Mar. 30, 2021

(65) Prior Publication Data

US 2022/0317142 A1  Oct. 6, 2022

(51) Int. Cl.
  *G01P 3/44* (2006.01)
  *G01D 5/244* (2006.01)
  *G01D 18/00* (2006.01)

(52) U.S. Cl.
  CPC ............ *G01P 3/44* (2013.01); *G01D 5/24495* (2013.01); *G01D 18/008* (2013.01)

(58) Field of Classification Search
  CPC ...... G01D 5/145; G01D 5/2448; G01D 5/142; G01D 5/24404; G01D 5/245; G01R 1/44; G01R 33/0017; G01R 33/07; G01R 33/0094; G01R 33/077; G01R 33/09
  See application file for complete search history.

(56) References Cited

U.S. PATENT DOCUMENTS

| 7,250,881 | B2* | 7/2007 | Kiriyama | G01D 5/2448 341/115 |
| 7,253,614 | B2* | 8/2007 | Forrest | G01D 5/2449 324/207.25 |
| 7,714,570 | B2 | 5/2010 | Thomas et al. | |
| 7,911,203 | B2 | 3/2011 | Thomas et al. | |
| 7,994,774 | B2 | 8/2011 | Thomas et al. | |
| 8,125,216 | B2 | 2/2012 | Thomas et al. | |
| 8,736,260 | B2 | 5/2014 | Foletto et al. | |
| 8,749,227 | B2 | 6/2014 | Thomas et al. | |
| 9,389,060 | B2* | 7/2016 | Romero | G01R 33/077 |
| 9,395,391 | B2 | 7/2016 | Fernandez et al. | |
| 9,551,762 | B1 | 1/2017 | Cesaretti | |
| 9,644,999 | B2 | 5/2017 | Foletto et al. | |

(Continued)

*Primary Examiner* — Giovanni Astacio-Oquendo
*Assistant Examiner* — Martin Walter Braunlich
(74) *Attorney, Agent, or Firm* — Daly, Crowley, Mofford & Durkee, LLP

(57) ABSTRACT

A method including: calculating a value of an average phase offset between a first signal and a second signal, wherein: (i) the first signal is generated by one or more first magnetic field sensing elements in response to the magnetic field, (ii) the second signal is generated by one or more second magnetic field sensing elements in response to the magnetic field, and (iii) the magnetic field is associated with a rotating target; storing the value of the average phase offset between the first signal and the second signal at an address in a non-volatile memory of the sensor; when the sensor is restarted, copying the value of the average phase offset from the address in the non-volatile memory to a working memory of the sensor; and using the copy of the value of the average phase offset that is stored in the working memory of the sensor to generate an output signal, the output signal being generated further based on the first signal and the second signal.

25 Claims, 12 Drawing Sheets

(56) References Cited

U.S. PATENT DOCUMENTS

| | | |
|---|---|---|
| 9,698,742 B2 | 7/2017 | Chaware et al. |
| 9,976,876 B2 | 5/2018 | Metivier et al. |
| 10,066,965 B2 | 9/2018 | Foletto et al. |
| 10,120,042 B2 | 11/2018 | Diaconu et al. |
| 10,578,679 B2 * | 3/2020 | Sitorus .................. G01R 33/09 |
| 10,598,739 B2 | 3/2020 | Shoemaker et al. |
| 10,845,434 B2 * | 11/2020 | Fernandez ............... G01R 1/44 |
| 10,866,118 B2 | 12/2020 | Foletto et al. |
| 10,908,229 B2 * | 2/2021 | Richards ............... G01R 33/072 |
| 10,962,385 B2 | 3/2021 | Metivier et al. |
| 11,009,565 B2 | 5/2021 | Fernandez et al. |
| 11,255,698 B2 * | 2/2022 | Bilbao De Mendizabal ............... G01D 5/145 |
| 2021/0041270 A1 * | 2/2021 | Granig .................. G01B 21/22 |
| 2021/0215775 A1 | 7/2021 | Kulla |

* cited by examiner

AUTOMATIC PHASE OFFSET CALCULATION

BACKGROUND

As is known, sensors are used to perform various functions in a variety of applications. Some sensors include one or more magnetic field sensing elements, such as a Hall effect element or a magnetoresistive element, to sense a magnetic field associated with proximity or motion of a target object, such as a ferromagnetic object in the form of a gear or ring magnet, or to sense a current, as examples. Sensor integrated circuits are widely used in automobile control systems and other safety-critical applications. There are a variety of specifications that set forth requirements related to permissible sensor quality levels, failure rates, and overall functional safety.

SUMMARY

According to aspects of the disclosure, a method is provided for use in a sensor that is arranged to sense a magnetic field, the method comprising: calculating a value of an average phase offset between a first signal and a second signal, wherein: (i) the first signal is generated by one or more first magnetic field sensing elements in response to the magnetic field, (ii) the second signal is generated by one or more second magnetic field sensing elements in response to the magnetic field, and (iii) the magnetic field is associated with a rotating target; storing the value of the average phase offset between the first signal and the second signal at an address in a non-volatile memory of the sensor; when the sensor is restarted, copying the value of the average phase offset from the address in the non-volatile memory to a working memory of the sensor; and using the copy of the value of the average phase offset that is stored in the working memory of the sensor to generate an output signal, the output signal being generated further based on the first signal and the second signal.

According to aspects of the disclosure, a sensor is provided, comprising: a volatile memory; a non-volatile memory; one or more first magnetic field sensing elements that are arranged to generate a first signal, the first signal being generated in response to a magnetic field that is associated with a rotating target; one or more second magnetic field sensing elements that are arranged to generate a second signal, the second signal being generated in response to the magnetic field; and a processing circuitry that is operatively coupled to the non-volatile memory and the volatile memory, the processing circuitry being configured to: calculate a value of an average phase offset between the first signal and the second signal; store the value of the average phase offset between the first signal and the second signal at an address in the non-volatile memory; when the sensor is restarted, copy the value of the average phase offset from the address in the non-volatile memory to the volatile memory; and use the copy of the value of the average phase offset that is stored in the volatile memory to generate an output signal, the output signal being generated further based on the first signal and the second signal.

According to aspects of the disclosure, a non-transitory medium storing one or more processor-executable instructions, which, when executed by a processing circuitry of a sensor, cause the processing circuity to perform the operations of: calculating a value of an average phase offset between a first signal and a second signal, wherein: (i) the first signal is generated by one or more first magnetic field sensing elements in response to the magnetic field, (ii) the second signal is generated by one or more second magnetic field sensing elements in response to the magnetic field, and (iii) the magnetic field is associated with a rotating target; storing the value of the average phase offset between the first signal and the second signal at an address in a non-volatile memory of the sensor; when the sensor is restarted, copying the value of the average phase offset from the address in the non-volatile memory to an address in a working memory of the sensor; and using the copy of the value of the average phase offset that is stored in the working memory of the sensor to generate an output signal, the output signal being generated further based on the first signal and the second signal.

BRIEF DESCRIPTION OF THE DRAWINGS

The foregoing features may be more fully understood from the following description of the drawings in which.

DETAILED DESCRIPTION

Figure 1A:
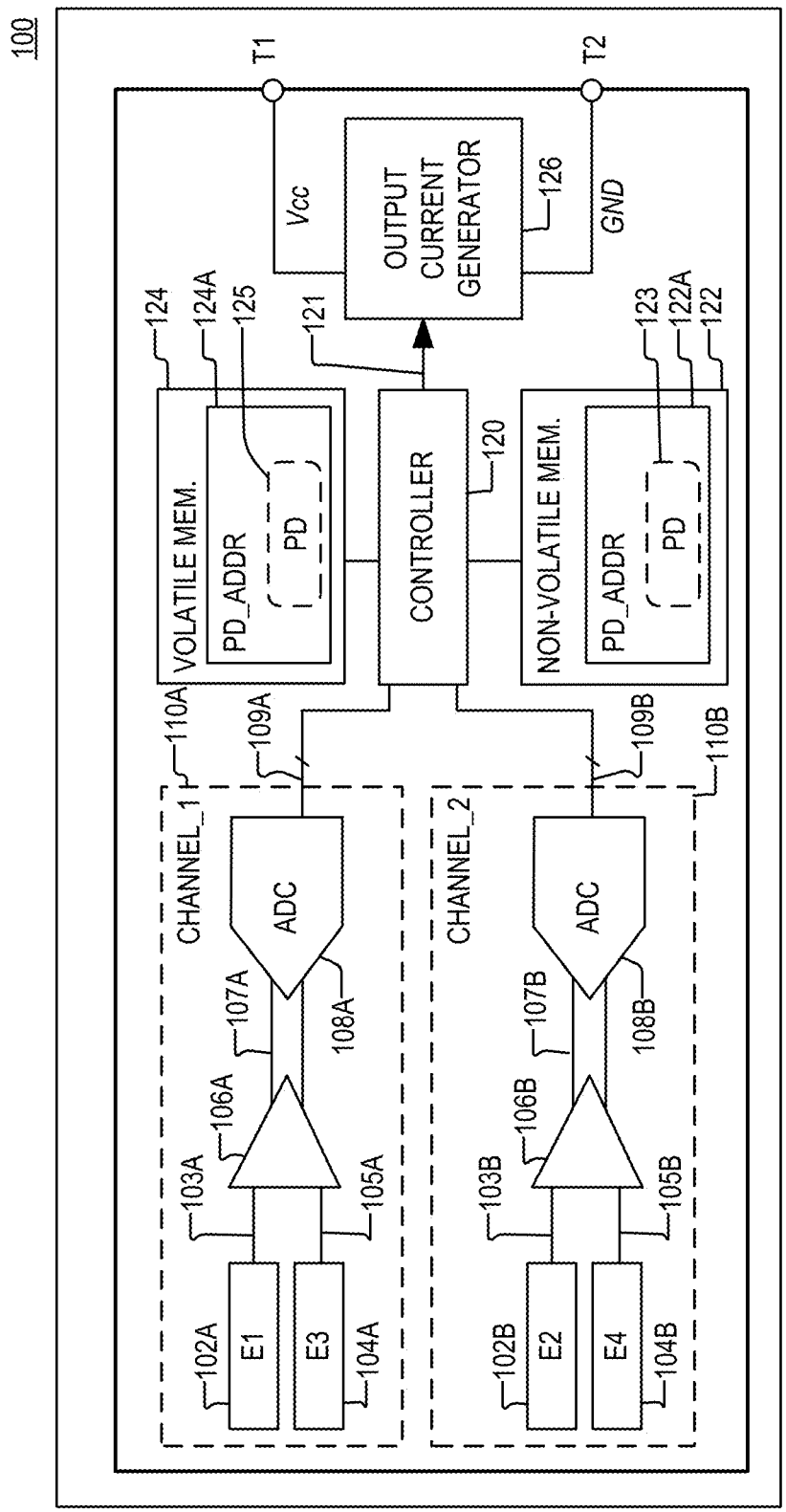
FIG. 1A is a diagram of an example of a sensor, according to aspects of the disclosure.

FIG. 1A is a diagram of an example of a sensor 100, according to aspects of the disclosure. In the example of FIG. 1A, the sensor 100 is a speed sensor. Alternative implementations are possible in which the sensor 100 includes a position sensor and/or any other suitable type of magnetic field sensor. In general, sensor 100 can be any sensor in which accurate detection of phase separation, or difference, or offset between two or more signals is required. According to the example of FIG. 1A, the sensor 100 may include a channel 110A, a channel 110B, a controller 120, a non-volatile memory 122, a volatile memory 124, and an output current generator.

The channel 110A may include a sensing element 102A, a sensing element 104A, an amplifier 106A, and an analog-to-digital converter (ADC) 108A. According to the example of FIG. 1A, each of the sensing elements 102A and 104A is a giant magnetoresistive (GMR) element. However, alternative implementations are possible in which each of the sensing elements 102A and 104A is another type of magnetic field sensing element, such as a Hall element or a tunnel magnetoresistive (TMR) element. Stated succinctly, the present disclosure is not limited to any specific implementation of the sensing elements 102A and 104A. In operation, the sensing elements 102A and 104A may generate signals 103A and 105A, respectively. The amplifier 106A may amplify the signals 103A and 105A to produce a signal 107A. The ADC 108A may digitize the signal 107A to produce a signal 109A.

As is known, there are different types of Hall effect elements, for example, a planar Hall element, a vertical Hall element, and a Circular Vertical Hall (CVH) element. As is also known, there are different types of magnetoresistance elements, for example, a semiconductor magnetoresistance element such as Indium Antimonide (InSb), a giant magnetoresistance (GMR) element, for example, a spin valve, an anisotropic magnetoresistance element (AMR), a tunneling magnetoresistance (TMR) element, and a magnetic tunnel junction (MTJ). The magnetic field sensing element may be a single element or, alternatively, may include two or more magnetic field sensing elements arranged in various configurations, e.g., a half bridge or full (Wheatstone) bridge. Depending on the device type and other application requirements, the magnetic field sensing element may be a device made of a type IV semiconductor material such as Silicon (Si) or Germanium (Ge), or a type III-V semiconductor material like Gallium-Arsenide (GaAs) or an Indium compound, e.g., Indium-Antimonide (InSb).

The channel 110B may include a sensing element 102B, a sensing element 104B, an amplifier 106B, and an ADC 108B. According to the example of FIG. 1A, each of the sensing elements 102B and 104B is a giant magnetoresistive (GMR) element. However, alternative implementations are possible in which each of the sensing elements 102B and 104B is another type of magnetic field sensing element, such as a Hall element or a tunnel magnetoresistive (TMR) element. Stated succinctly, the present disclosure is not limited to any specific implementation of the sensing elements 102B and 104B. In operation, the sensing elements 102B and 104B may generate signals 103B and 105B, respectively. The amplifier 106B may amplify the signals 103B and 105B to produce a signal 107B. The ADC 108B may digitize the signal 107B to produce a signal 109B.

The controller 120 may include any suitable type of processing circuitry. In some implementations, the controller may include a general-purpose processor, an application-specific processor, and/or any other suitable type of processing circuitry. The non-volatile memory 122 may include an Electrically Erasable Programmable Read-Only Memory (EEPROM) and/or any other suitable type of non-volatile memory. The volatile memory 124 may include a Dynamic Random-Access Memory (DRAM) and/or any other suitable type of volatile memory.

The non-volatile memory 122 may include an address 122A that is designated to store a value 123 of a phase offset, or difference between the signals 109A and 109B. The volatile memory 124 may include an address 124A that is designated to store a value 125 of the phase offset between the signals 109A and 109B. Together with the signals 109A and 109B, the value 125 may be used by the controller 120 to generate a signal 121. The signal 121 may be indicative of the speed of rotation and/or direction of rotation of a target 130 (shown in FIG. 1B). The signal 121 may be a pulse-encoded signal or a signal encoded in accordance with the AK-protocol (e.g., also known as the AK-Protokoll). It will be understood that the present disclosure is not limited to any specific encoding of the signal 121. Although in the example of FIG. 1, the signal 121 is output via a current generator, alternative implementations are possible in which the signal 121 is output via a different interface, such as an Inter-Integrated Circuit (I²C) interface or a CAN (Controller Area Network). In this regard, it will be understood that the present disclosure is not limited to using any specific interface for outputting the signal 121.

The values 123 and 125 of the phase offset between the signals 109A and 109B may be calculated by the controller 120. This is in contrast to some conventional speed (or angle) sensors in which the value of the phase offset between internal magnetic field signals (such as the signals 109A and 109B) is set in the factory. In general, the value of the phase offset between internal magnetic field signals (such as the signals 109A and 109B) of a sensor depends on the dimensions of the target whose movements the sensor is used to monitor. Accordingly, when conventional sensors are manufactured, they have to be customized to store a phase offset value, which is provided by the customer, and which is specific to the application in which the conventional sensors are going to be deployed. As noted above, unlike conventional sensors, the sensor 100 automatically discovers the phase offset between the signals 109A and 109B when it is powered on for the first time (after it has been mounted and/or after it has left the factory), and it does not need to have the value of the phase offset set in the factory. This allows the sensor 100 to be used across a range of applications, and may help reduce the sensor's 100 manufacturing cost. Examples of processes for discovering and/or updating the value of the phase offset between the signals 109A and 109B are discussed further below with respect to FIGS. 6A-C.

According to the present example, the value 125 is used by the controller 120, at runtime, to generate a signal 121. Because the value 125 is stored in volatile memory, when the sensor 100 is powered off, the value 125 is erased. The value 123, on the other hand, constitutes a permanent copy of the phase offset between signals 109A and 109B. Because the value 123 is stored in non-volatile memory, when the sensor 100 is powered off, the value 123 is preserved. When the sensor 100 is powered on (for a second or subsequent time), the value 123 may be copied back to the address 124A of the volatile memory 124. In this scenario, the value 125 may be a copy of the value 123.

In another aspect, the controller 120 may periodically recalculate the value of the phase offset between the signals 109A and 109B. When a new value is calculated for the phase offset between the signals 109A and 109B, the new value may be stored at address 124A of the volatile memory 124 and subsequently copied to address 122A of the non-volatile memory 122. Depending on how far along the controller 120 is in updating the value of the phase offset between the signals 109A and 109B, the value 125 may or may not be the same as the value 123, at any given time.

Figure 1B:
FIG. 1B is a diagram illustrating the operation of the sensor of FIG. 1A, according to aspects of the disclosure.

FIG. 1B is a diagram illustrating the operation of the sensor 100, in further detail. As illustrated, when the sensor 100 is deployed in the field, the sensor 100 may be disposed adjacent to a rotating target 130, as shown. The rotating target 130 may include a permanent magnet, an electromagnet, a ferromagnetic gear, and/or any other suitable type of target whose motion (i.e., rotation) affects a magnetic field to which the sensor 100 is exposed. In some embodiments, a magnet, which may be referred to as a back-bias magnet, can be provided to generate the magnetic field that is affected by target rotation. In some implementations, the rotating target may be coupled to a rotating element (not shown) of mechanical system. The rotating element may include a shaft, a gear, and/or any other suitable type of rotating element. In operation, the sensor 100 may monitor a magnetic field that is generated by the target 130 and/or affected by movement of the target and output a signal that is indicative of the speed of the target.

Figure 1C:
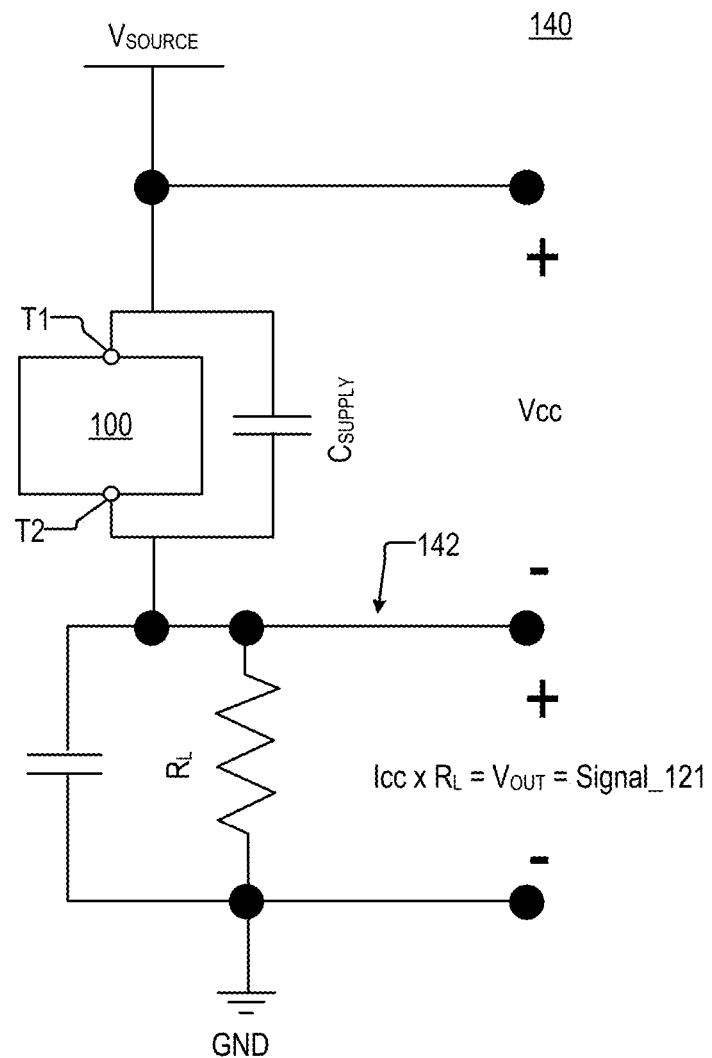
FIG. 1C is a diagram of a circuit including the sensor of FIG. 1A, according to aspects of the disclosure.

FIG. 1C is a diagram of an application circuit 140 that includes the sensor 100. As illustrated, the sensor 100 may be coupled in series with an RC circuit 142, and the output of the sensor 100 may be received, as the signal Vout, across the resistor of the RC circuit 142. The signal Vout and the signal 121 may have the same informational content, with respect to at least one of the speed, angular position, and/or direction of rotation of the target 130. However, the signals 121 and Vout may or may not have the same waveform. By way of example, the application circuit 140 may be part of various automated control systems, such as an automated control system that is part of an automotive transmissions, an automated control system that is part of a differential, an automated control system that is part of an electric motor, and/or an automated control system that is part of internal combustion engine. However, it will be understood that the present disclosure is not limited to any specific application of the sensor 100.

Figure 1D:
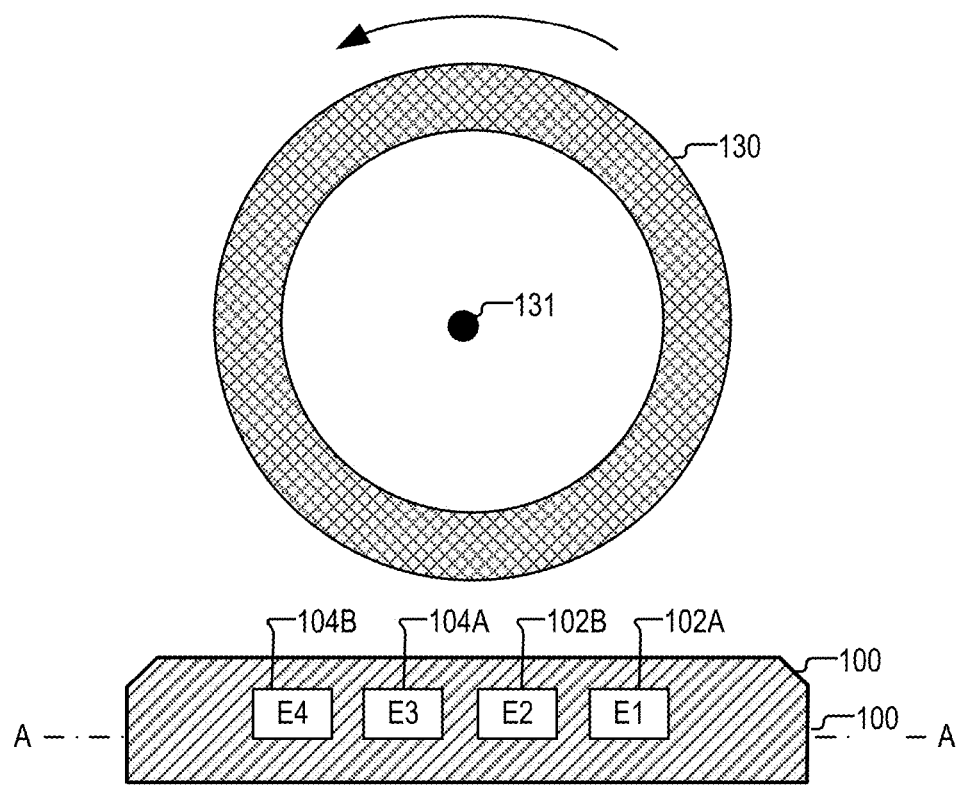
FIG. 1D is a diagram illustrating the operation of the sensor of FIG. 1A, according to aspects of the disclosure.

FIG. 1D is a diagram illustrating the operation of the sensor 100, in further detail. As illustrated, the target 130 may be configured to rotate about a rotational axis 131. The sensor 100 may be disposed adjacent to the target 130. The sensing elements 102A, 104A, 102B, and 104B may be disposed along an axis A-A of the sensor 100. Furthermore, the pairs of sensing elements 102A-104A and 102B-104B may be interleaved with each other, such that sensing element 104B is disposed adjacent to sensing element 104A and sensing element 102B is disposed between sensing elements 104A and 102A.

Figure 2:
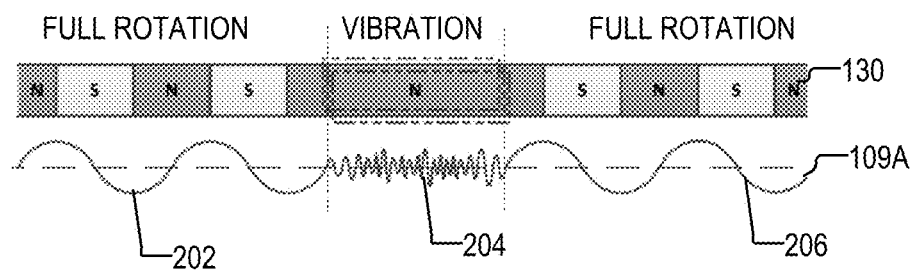
FIG. 2 is a diagram illustrating a method for detecting target vibration, according to aspects of the disclosure.

FIG. 2 is a diagram illustrating aspects of the operation of the sensor 100, according to one example. FIG. 2 includes a plot of respective waveforms that are represented by digital signals 109A and 109B. FIG. 2 illustrates that the target 130 may be in a state of full rotation or a state in which the target 130 is experiencing vibration. The plot of the signal 109A includes sections 202, 204, and 206. Sections 202 and 206 show the shape of the waveform of signal 109A when the target 130 is in a state of full rotation. Section 204 shows the shape of the waveform of the signal 109A when the target 130 is experiencing vibration. As illustrated, when the target 130 is vibrating, the signal 109A may include a larger number of peaks and/or have an uneven waveform shape. By way of example, the vibration of the target 130 may be measured as one or more of acceleration, velocity, or displacement. The amount of vibration experienced by the target 130 may be determined in a well-known fashion from the signal 109A and/or any of the signals 109B and 121. For example, vibration detection is discussed in U.S. Pat. No. 7,772,838, entitled "Methods and Apparatus for Vibration Detection," which patent is incorporated herein by reference in its entirety. As used throughout the disclosure, the phrase "true rotation" may refer to a state in which the amount of vibration exhibited by the target 130 is below a predetermined threshold. In some implementations, the target 130 may be in a state of true rotation when the amount of vibration exhibited by the target is not significant enough to interfere with the determination of the phase offset between signals 109A and 109B.

Figure 3:
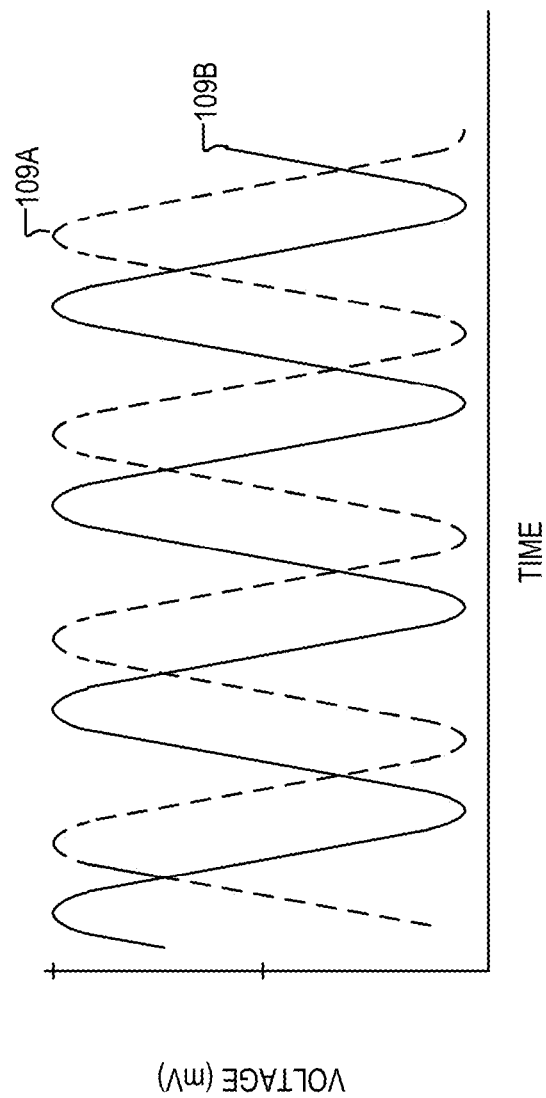
FIG. 3 is a diagram of internal signals that are generated by the sensor of FIG. 1A, according to aspects of the disclosure.

FIG. 3 is a plot of the signals 109A and 109B. It will be recalled that signal 109A is a digital representation of signal 107A. In this regard, it will be understood that numerals 109A and 107A may be used interchangeably to refer to the waveform that is represented by each one of the signals 109A and 107A. It will be recalled that signal 109B is a digital representation of signal 107B. In this regard, it will be understood that numerals 109B and 107B may be used interchangeably to refer to the waveform that is represented by each one of the signals 109 Band 107A. FIG. 3 illustrates that the signals 109A and 109B may be out of phase with each other. The phase offset between the signals 109A and 109B may depend on the diameter of the target and/or other characteristics of the environment in which the sensor 100. The phase offset between the signals 109A and 109B may be used in generating the signal 121, which is output from the controller 120 to the output current generator 126. As noted above, the signal 121 may be indicative of at least one of the speed, position, and/or direction of rotation of the target 130. An example of a method for generating the signal 121 based on the phase offset between the signals 109A and 109B is discussed further below with respect to FIGS. 7A-B.

Figure 4:
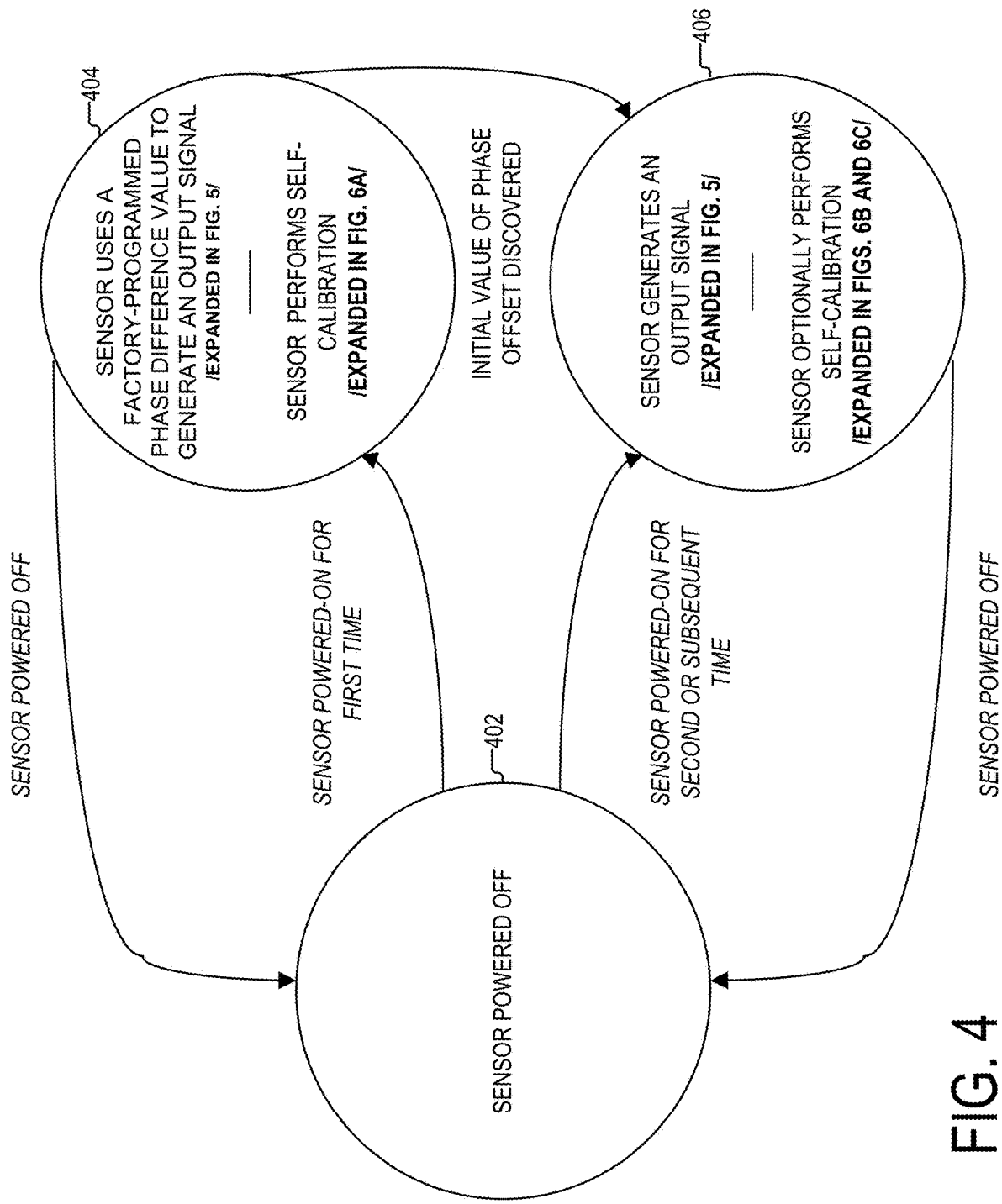
FIG. 4 is a state diagram illustrating the operation of the sensor of FIG. 1A, according to aspects of the disclosure.

FIG. 4 is a state diagram illustrating aspects of the operation of the sensor 100, according to one example. FIG. 4 illustrates that the sensor 100 may be in one of states 402, 404, and 406.

State 402 may be a state in which the sensor 100 is powered off or otherwise inoperative. The sensor 100 may enter the state 402 when it is powered off. The sensor 100 may exit the state 402 when the sensor 100 is powered on. Specifically, when the sensor 100 is powered on for the first time (e.g., after leaving the factory), the sensor may transition from state 402 to state 404. On the other hand, when the sensor 100 is powered on for a second or subsequent time, the sensor 100 may transition from state 402 into state 406. In other words, in some implementations, state 404 may be entered by the sensor 100 only once, when the sensor 100 is powered on for the first time.

State 404 may be a state in which the sensor 100 determines the phase offset between the signals 109A and 109B for the first time. When in state 404, the sensor 100 may execute a process 600A, which is discussed further below with respect to FIG. 6A. As a result of executing the process 600A, the sensor 100 may generate the values 123 and 125 of the phase offset between the signals 109A and 109B. The sensor 100 may store the value 123 at address 122A in the non-volatile memory 122. The sensor 100 may store the value 125 at address 124A in the volatile memory 124. The sensor 100 may enter state 404 when it is powered on for the first time. The sensor 100 may exit state 404 after the value 125 has been stored in the volatile memory 124 and/or after the value 123 has been stored in the non-volatile memory 122.

Optionally, when the sensor 100 is in state 404, the sensor 100 may generate output data based on a factory-programmed value for the phase offset between signals 109A and 109B. In some instances, the factory-programmed value may be less accurate than the phase offset value that is determined by executing process 600A because it does not take into account the specific context in which the sensor 100 is deployed. However, the factory-programmed value for the phase offset may be sufficiently accurate to enable the sensor 100 to generate output data until the execution of the process 600A is completed.

In some implementations, the factory-programmed value for the phase offset may be stored at address 122A in the non-volatile memory 122, and it may be copied to address 124A of the volatile memory 124 when the sensor 100 is powered on for the first time. In some implementations, the factory-programmed value for the phase offset may be overwritten with a new phase offset value (in either one of the volatile memory 124 and the non-volatile memory 122) when the execution of process 600A is completed.

State 406 may be a state in which the sensor 100 generates output data and, optionally, updates the values 123 and 125 of the phase offset between the signals 109A and 109B. When the sensor is in state 406 the sensor 100 may execute a process 500 for generating output data, which is discussed further below with respect to FIG. 5. Furthermore, when the sensor 100 is in the state 406, the sensor 100 may execute a process 600B for updating the values 123 and 125 of the phase offset between signals 109A and 109B. The process 600B is discussed further below with respect to FIGS. 6B-6C. The sensor 100 may enter state 406 (from state 402) when it is powered on for a second or subsequent time (e.g., after leaving the factory). In addition, the sensor 100 may enter state 406 (from state 404), when the value of the phase offset between signals 109A and 109B is determined for the first time. The sensor 100 may exit state 406, when the sensor 100 is powered off.

Figure 5:
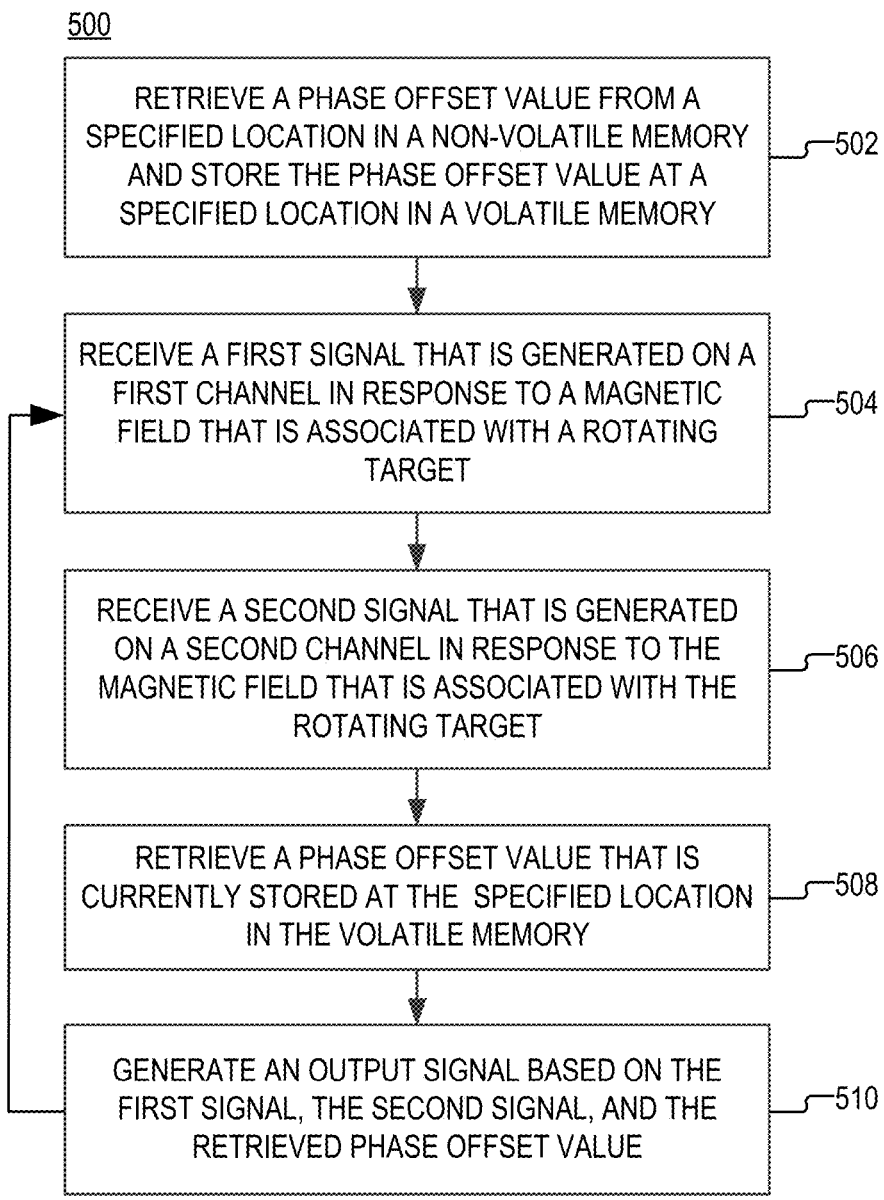
FIG. 5 is a flowchart of an example of a process, according to aspects of the disclosure.

FIG. 5 is a flowchart of an example of a process 500, according to aspects of the disclosure. At step 502, the controller 120 retrieves the value 123 of the phase offset between signals 109A and 109B from the non-volatile memory 122, and copies it to address 124A of the volatile memory 124. The copy of the value 123 is denoted as phase offset value 125 in FIG. 1. At step 504, the controller 120 receives the signal 109A from the ADC 108A. At step 506, the controller 120 receives the signal 109B from the ADC 108B. At step 508, the controller 120 retrieves the value 125 of the phase offset between the signals 109A and 109B from the volatile memory 124. At step 510, the controller 120 generates the signal 121 based on the signal 109A, the signal 109B, and the value 125 of the phase offset between the signals 109A and 109B. An example of a method for generating the signal 121 based on the signal 109A, the signal 109B, and the value 125 of the phase offset between the signals 109A and 109B is discussed further below with respect to FIGS. 7A-B.

Figure 6A:
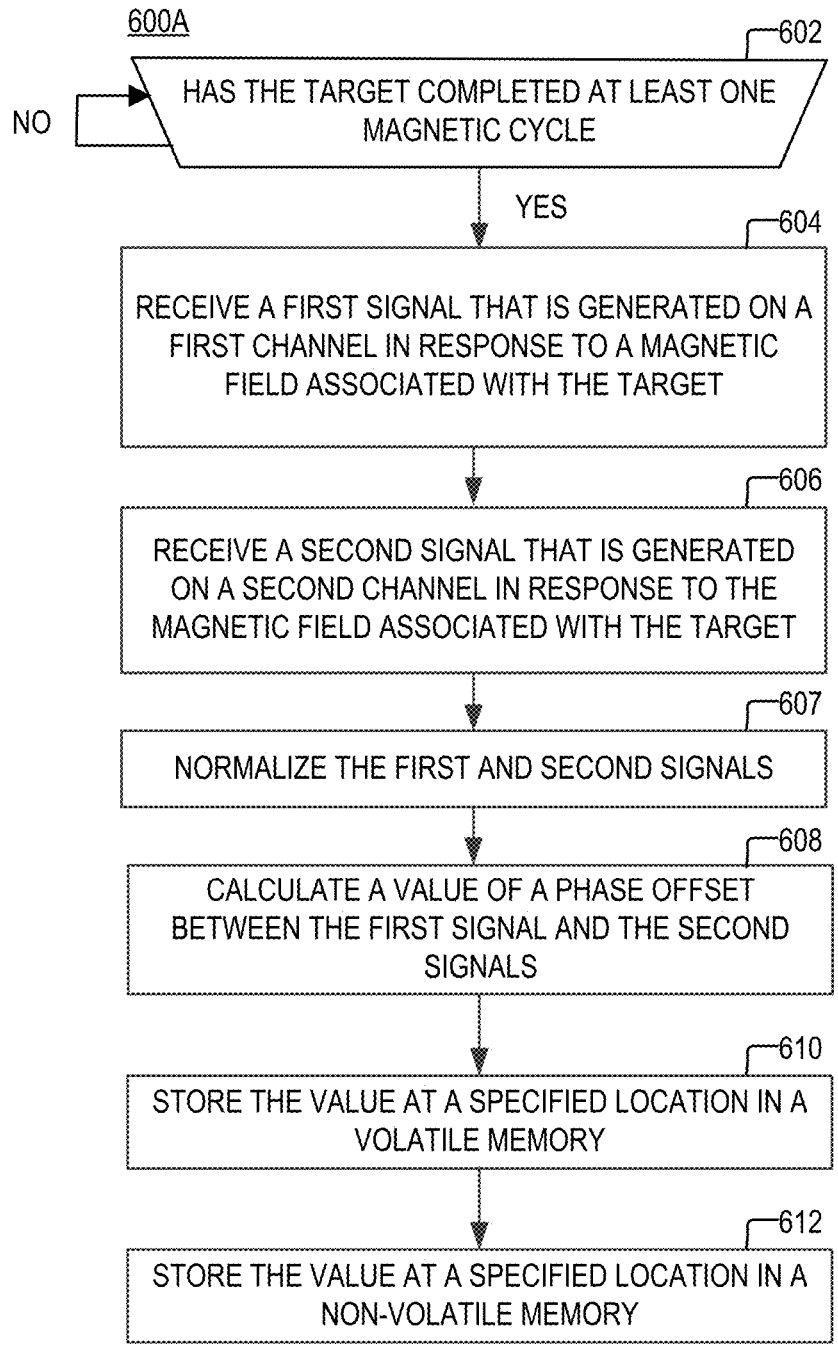
FIG. 6A is a flowchart of an example of a process, according to aspects of the disclosure.

FIG. 6A is a flowchart of an example of a process 600A for determining the phase offset between signals 109A and 109B, according to aspects of the disclosure. As noted above, the process 600A may be executed when the sensor 100 is powered on for the first time (e.g., when the sensor 100 is in state 404). For instance, the process 600A may be executed after the sensor 100 is installed in a particular electronic circuit, such as the electronic circuit shown in FIG. 1B. Prior to executing the process 600A, no value of the phase offset between signals 109A and 109B may be available in each of the non-volatile memory 122 and the volatile memory 124. Because no value of the phase offset between signals 109A and 109B is available in the non-volatile memory 122 and the volatile memory 124, the controller 120 may need to first execute the process 600A before the sensor can generate the signal 121. In other words, the process 600A may be executed as part of initial calibration that is performed when the sensor 100 is powered on for the first time (after the sensor 100 is mounted in a particular electronic circuit and/or after the sensor 100 has left the factory).

At step 602, the controller 120 detects whether the target 130 has completed at least one magnetic cycle. According to the present example, the target 130 has completed one magnetic cycle when at least one positive magnetic pole of the target and at least one negative magnetic pole of the target has passed the sensor 100 (e.g., see FIG. 1B). If the target 130 has completed one magnetic cycle, the process 600A proceeds to step 604. Otherwise, if the target 130 has not completed one magnetic cycle, step 602 is repeated. At step 604, the controller 120 receives the signal 109A from the ADC 108A. At step 606, the controller 120 receives the signal 109B from the ADC 109B. At step 607, the signals 109A and 109B are normalized. At step 608, the controller 120 calculates the value of the phase offset between the signals 109A and 109B. At step 610, the controller 120 stores the calculated value at address 124A in the volatile memory 124. In some implementations, as noted above, the calculated value of the phase offset between signals 109A and 109B may be used to overwrite a factory-programmed value for the phase offset that is stored at address 124A of the volatile memory 124. And at step 612, the controller 120 stores the calculated value at address 122A in the non-volatile memory 125. As can be readily appreciated, after steps 610 and 612 are completed, the values 123 and 125 are copies of the phase offset value that is calculated at step 608. In some implementations, as noted above, the calculated value of the phase offset between signals 109A and 109B may be used to overwrite a factory-programmed value for the phase offset that is stored at address 122A of the non-volatile memory 122.

The phase offset between signals 109A and 109B may be calculated in a well-known fashion by the controller 120. For example, to calculate the phase offset between signals 109A and 109B, the controller 120 may calculate a first Fast Fourier Transform (FFT) of signal 109A and a second FFT of signal 109B. Next, the controller 120 may identify the highest value of the first FFT and the highest value of the second FFT. The highest value of the first FFT may have a first real part $X_1$ and a first imaginary part $Y_1$. The highest value of the second FFT may have a second real part $X_2$ and a second imaginary part $Y_2$. Next, the controller 120 may identify the phase of the signal 109A by taking the inverse tangent of the real part $X_1$ over the imaginary part $Y_1$. Next, the controller 120 may identify the phase of the signal 109B by taking the inverse tangent of the real part $X_2$ over the imaginary party $Y_2$. And finally, the controller 120 may subtract the phase of signal 109B from the phase of signal 109A to identify the value of the phase offset between signals 109A and 109B.

Figure 6B:
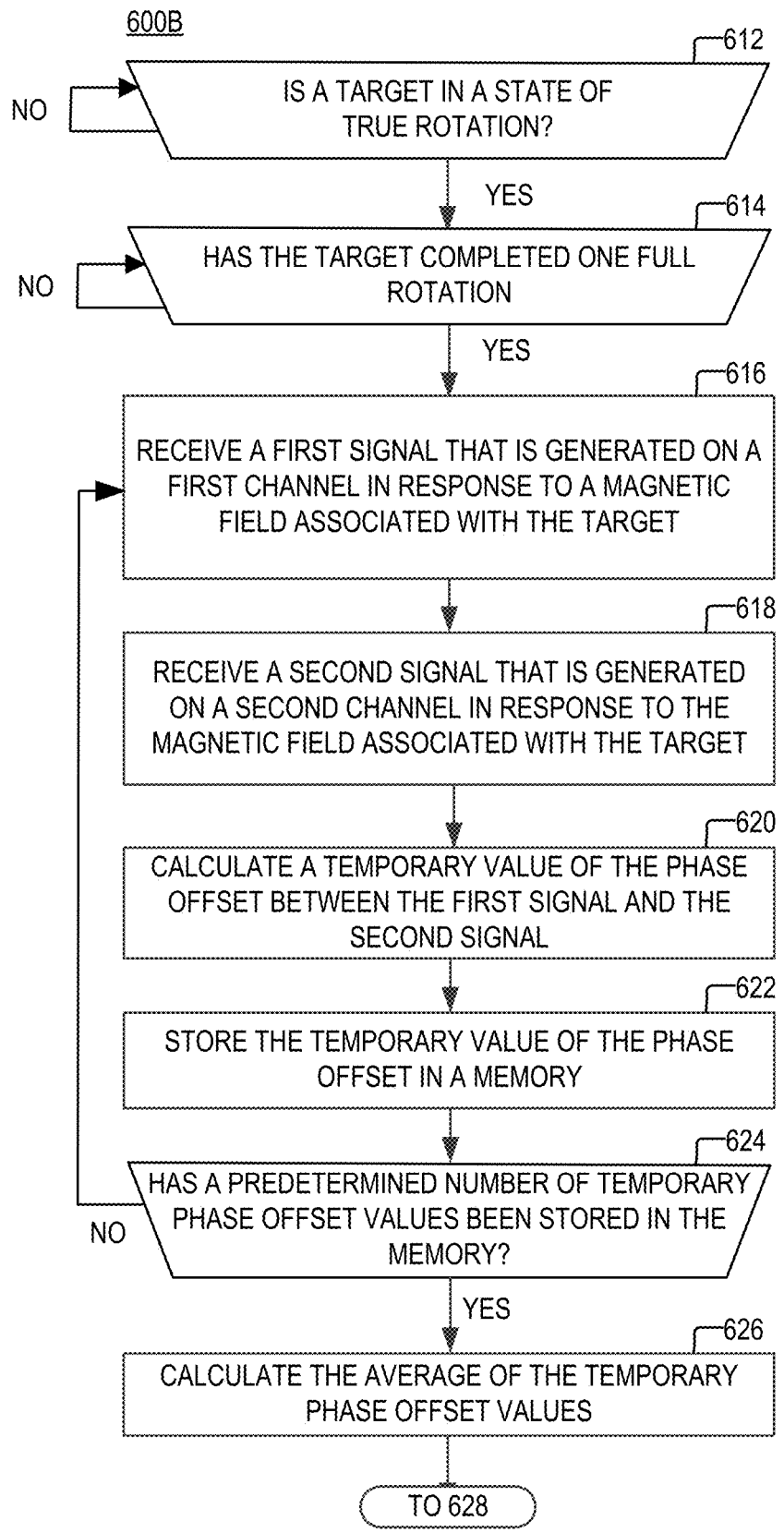
FIG. 6B is a flowchart of an example of a process, according to aspects of the disclosure.
Figure 6C:
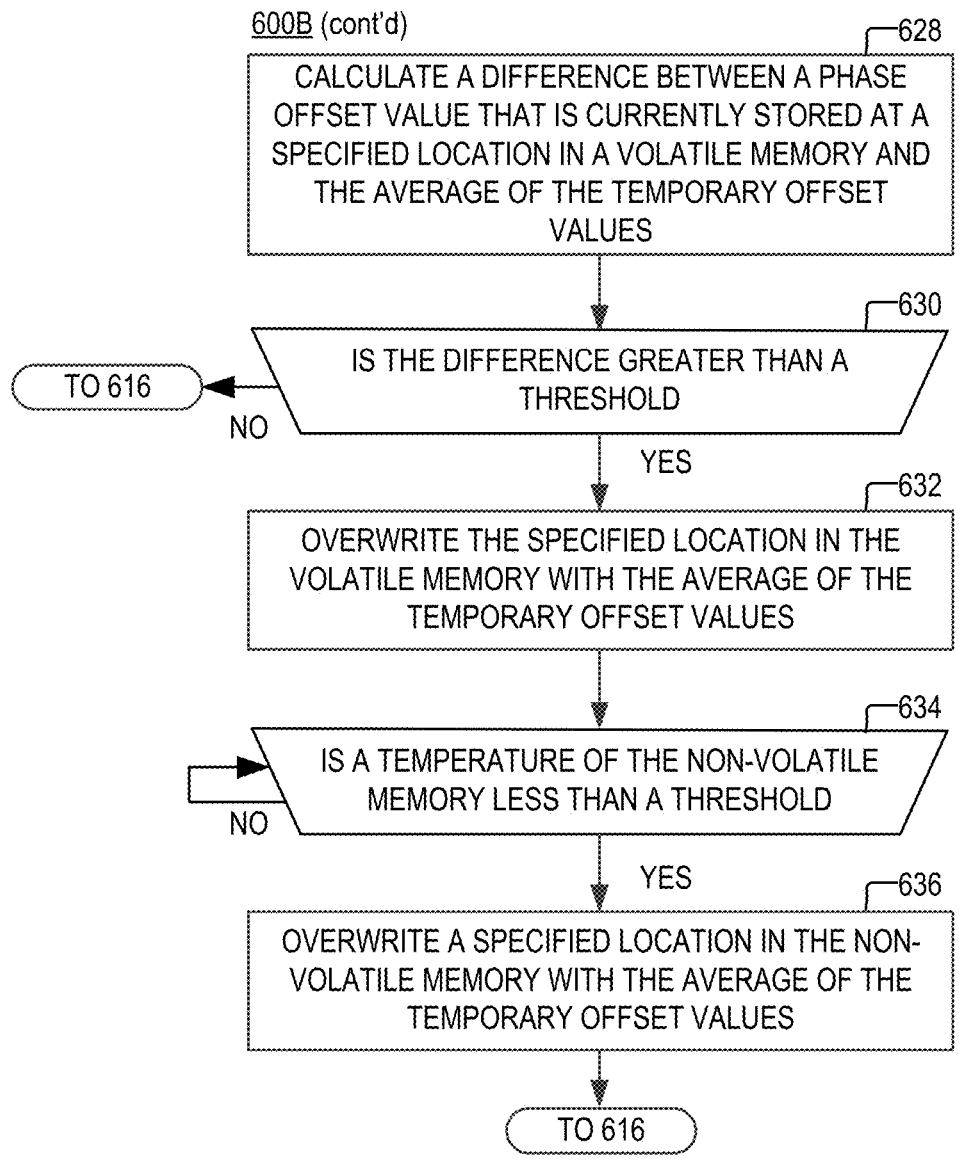
FIG. 6C is a flowchart of an example of a process, according to aspects of the disclosure.

FIGS. 6B-C show a flowchart of an example of a process 600B for updating the value of the phase offset between signals 109A and 109B. As noted above, the process 600B may be executed when the sensor 100 is powered on for a second or subsequent time (e.g., when the sensor 100 is in state 406). In some implementations, the process 600B may be executed concurrently with the process 500, which is discussed above with respect to FIG. 5. In some implementations, the process 600B may be executed as part of continuous and/or periodic calibration that is performed by the sensor 100 over its lifetime. Performing continuous and/or periodic calibration of the sensor 100 is advantageous because it may help increase the accuracy of the sensor 100.

At step 612, the controller 120 determines whether the target 130 is in a state of true rotation. If the target is in a state of true rotation, the process 600B proceeds to step 614. Otherwise, if the target is not in a state of true rotation, step 612 is repeated. At step 614, the controller 120 detects if the target 130 has completed one full rotation. If the target 130 has completed one full rotation, the process 600B proceeds to step 616. Otherwise, if the target 130 has not completed one full rotation, step 614 is repeated again.

At step 616, the controller 120 receives the signal 109A from the ADC 108A. At step 618, the controller 120 receives the signal 109B from the ADC 108B. At step 620, the controller 120 calculates a temporary value of the phase offset between the signals 109A and 109B. At step 622, the controller 120 stores the calculated temporary phase offset value in the memory 124. As can be readily appreciated, the signals 109A and 109B may be normalized before step 620 is executed. At step 624, the controller 120 determines if a predetermined number of temporary phase offset values has been stored in the memory 124. If the predetermined number of temporary phase offset values is stored in the memory 124, the process 600B proceeds to step 626. Otherwise, if the predetermined number of phase offset values have not been yet stored in the memory 124, the process 600B returns to 616, and another phase offset value is calculated. At step 626, the controller 120 calculates the average of the temporary offset values. Steps 616-626 define an arrangement in which the average phase offset of the signals 109A and 109B is calculated over a period of time. The term "temporary" as used in the phrase "temporary offset value" denotes that the "temporary" offset value is deleted, after the average phase of the temporary offset values is calculated, to free memory space for the next execution of the process 600B (and/or steps 616-624).

At step 628, the controller 120 calculates the difference between the average phase offset value (calculated at step 626) and the value 125 of the phase offset between signals 109A and 109B. At step 630, the controller 120 determines if the difference is greater than a threshold. If the difference is greater than the threshold, the process 600B proceeds to step 632. Otherwise, if the difference is less than or equal to the threshold, the process 600B returns to step 616. At step 632, the controller 120 replaces or overwrites address 124A of the volatile memory 124 with the average phase offset value (calculated at step 626). Doing so has the effect of setting the value 125 of the phase offset of signals 109A and 109B to equal the average phase offset value. It will be recalled that the value 125 is the phase offset value used at runtime, by the controller 120, to generate the signal 121. At step 634, the controller 120 identifies the current temperature of the non-volatile memory 122 (and/or sensor 100) and determines if the current temperature of the sensor 100 is less than a temperature threshold. If the current temperature is not less than the temperature threshold, the process 600B repeats step 634. Otherwise, if the current temperature of the sensor 100 is below the temperature threshold, the process 600B proceeds to step 636. The temperature of the non-volatile memory 122 (and/or sensor 100) may be determined by using a temperature sensor that is integrated into the sensor 100 (not shown) and/or any other temperature sensor. At step 636, the controller 120 overwrites address 122A of the non-volatile memory 122 with the average phase offset value (calculated at step 626). Doing so has the effect of setting the value 123 of the phase offset of signals 109A and 109B to equal the average phase offset value. It will be recalled that the value 123 is the phase offset value that is copied, at boot time, in the volatile memory 124 and subsequently used (until it is updated) to generate the signal 121. After step 636 is completed, the process 600B may return to step 616.

In some respects, overwriting the address 122A only when the temperature of the sensor 120 is below a threshold ensures that the overwriting of the address 122A will complete without errors, which might otherwise occur when the temperature of the sensor 100 (and/or the non-volatile memory 122) is above the operating temperature range for the memory 122. In some implementations, the temperature threshold (used at step 634) may be equal to (or otherwise based on) the upper bound of a normal operating temperature range for the memory 122.

Figure 7A:
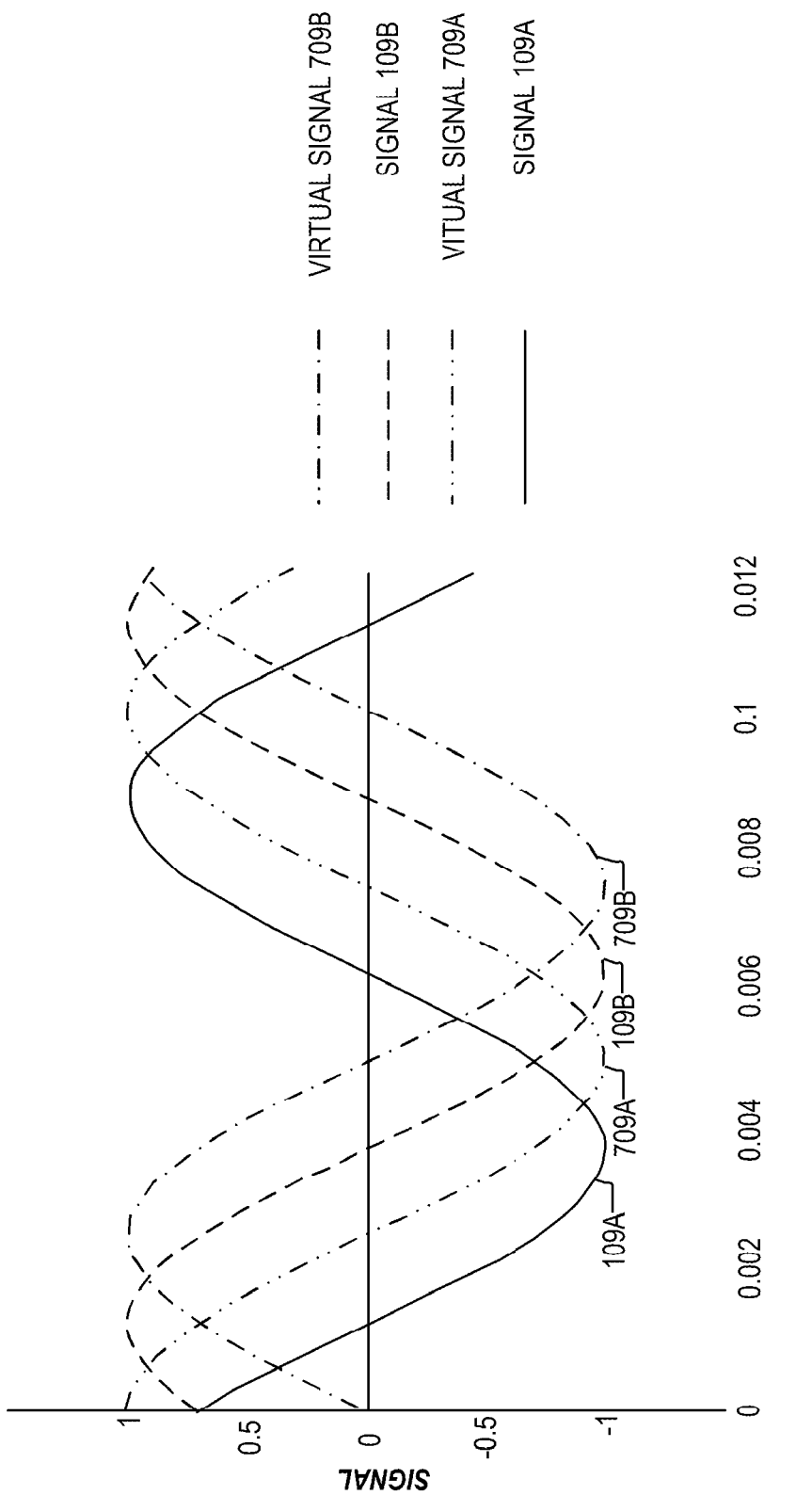
FIG. 7A is a plot of virtual signals that are generated based on the internal signals of FIG. 3.

FIG. 7A is a plot illustrating waveforms represented by signals 109A and 109B, as well as the waveforms of virtual signals 709A and 709B. The virtual signals 709A and 709B may be generated by interpolating the signals 109A and 109B based on their phase offset. Specifically, signal 709A may be generated by shifting the signal 109A by one-half of the offset between signals 109A an d 109B. Signal 709B may be generated by shifting the signal 109B by one-half the offset between signals 109A and 109B. By way of example, the term "virtual signal" may refer to a signal that is indicative of a magnetic field affected by a target object, but which signal is computationally generated based on plurality of phase-separated measured magnetic field signals (e.g., signals 109A and 109B, etc.) which phase-separated measured magnetic field signals are generated by one or more respective magnetic field sensing elements. Virtual signal generation and use is described in U.S. Pat. No. 10,578,679 entitled "Magnetic Field Sensors Having Virtual Signals", 10,598,739 entitled "Magnetic Field Sensors Having Virtual Signals", 10,866,118 entitled "High Resolution Magnetic Field Sensors", 10,908,229 entitled "Regulation Of Coefficients Used In Magnetic Field Sensor Virtual Signal Generation", all of which are incorporated herein by reference in their entirety.

Figure 7B:
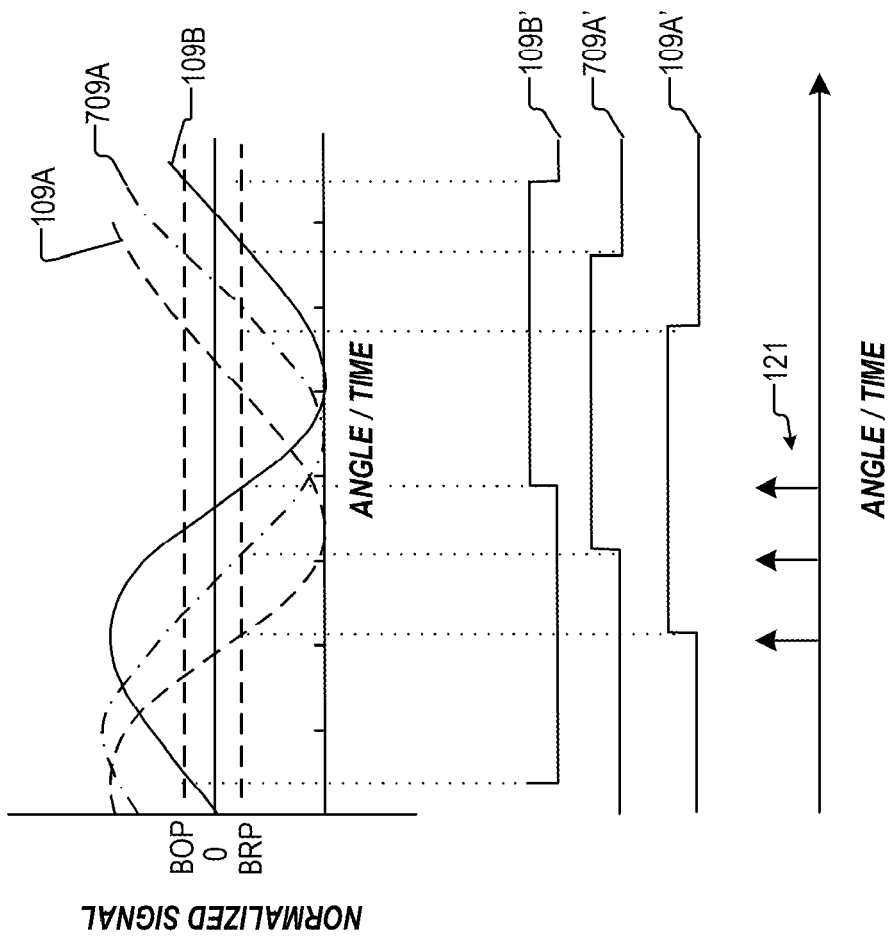
FIG. 7B is a plot illustrating the relationship between the virtual signals of FIG. 7A and an output signal that is generated by the sensor of FIG. 1A.

FIG. 7B is a plot illustrating aspects of a process for generating the signal 121, according to one implementation. Shown in the plot are signals 709A, 109B, and 109B, as well as waveforms 109A', 109B', and 709A'. Also shown in the plot are operate and release thresholds BOP and BRP. As an example, the BOP can represent a first percentage (e.g., 60%) of the peak-to-peak value of the signal 109A and the BRP threshold can represent a second, different percentage (e.g., 40%) of the peak-to-peak value of the signal 109A. Other threshold levels are possible including but not limited to other percentages of the peak-to-peak magnetic field signal, thresholds that are a predetermined percentage or a predetermined absolute difference with respect to positive and negative peaks of the magnetic field signal, etc.

When the signal 109A crosses the BRP threshold, the waveform 109A' transitions, here to a logic high level, and when the signal 109A crosses the BOP threshold, the waveform 109A' is set to a logic low level. When the signal 109B crosses the BRP threshold, the waveform 109B' transitions, here to a logic high level, and when the signal 109B crosses the BOP threshold, the waveform 109B' is set to a logic low level. When the signal 709A crosses the BRP threshold, the waveform 709A' transitions, here to a logic high level, and when the signal 709A crosses the BOP threshold, the waveform 709A' is set to a logic low level.

Also shown in FIG. 7B is a plot of the signal 121. According to the example of FIG. 7B, the signal 121 is pulse-encoded, and each pulse in the signal 121 may correspond to a rising edge in any of the waveforms 109A', 109B', and 709A'. Each of the pulses in the signal 121 may correspond to a different angular position of the rotating target 130, which allows the signal 121 to be used to determine the speed and acceleration of the target 130. Stated succinctly, FIG. 7B illustrates that knowledge of the phase offset between signals 109A and 109B can be used to interpolate the signals 109A and 109B, thus increasing the resolution of the signal 121 and/or sensor 100. Although FIG. 7B shows only the virtual signal 709A, it will be understood that the virtual signal 709B may be used similarly in the generation of the signal 121. Further, while only one or two virtual signals are shown in FIG. 7B, 7A, respectively, it will be appreciated that any number of virtual signals are possible. Stated succinctly, FIG. 7B illustrates that, in some implementations, the signal 121 may be a pulse signal, wherein each pulse in the signal is generated in response to a rising slope of one of the signals 109A, 109B, 709A, and 709B crossing a threshold. In some implementations, the direction of rotation of the target 130 may be encoded in the width of each of the pulses of the signal 121.

Having described preferred embodiments, which serve to illustrate various concepts, structures and techniques, which are the subject of this patent, it will now become apparent that other embodiments incorporating these concepts, structures and techniques may be used. Accordingly, it is submitted that the scope of the patent should not be limited to the described embodiments but rather should be limited only by the spirit and scope of the following claims.

The invention claimed is:

1. A method for use in a sensor that is arranged to sense a magnetic field, the method comprising:
    calculating, by a processing circuitry of the sensor, a value of an average phase offset between a first signal and a second signal, wherein: (i) the first signal is generated, at least in part, by one or more first magnetic field sensing elements in response to the magnetic field, (ii) the second signal is generated, at least in part, by one or more second magnetic field sensing elements in response to the magnetic field, and (iii) the magnetic field is associated with a target, wherein calculating the average phase offset includes calculating a plurality of phase offset values and calculating an average of the phase offset values, each of the phase offset values being indicative of a phase offset between the first signal and the second signal at a different time instant;
    storing, by the processing circuitry of the sensor, the calculated value of the average phase offset between the first signal and the second signal at an address in a non-volatile memory of the sensor; and
    when the sensor is restarted, copying the calculated value of the average phase offset from the address in the non-volatile memory to a working memory of the sensor, and using the copy of the calculated value of the average phase offset that is stored in the working memory of the sensor to generate an output signal of the sensor, the output signal of the sensor being indicative of at least one of speed of rotation of the target and/or angular position of the target,
    wherein the one or more first magnetic field sensing elements and the one or more second magnetic field sensing elements are part of the sensor, and the value of the average phase offset is calculated and stored as part of an internal calibration routine that is performed by the processing circuitry of the sensor, the internal calibration routine being performed during operation of the sensor, after the sensor is deployed.

2. The method of claim 1, wherein storing the calculated value of the average phase offset includes overwriting a factory-programmed phase offset value in the non-volatile memory of the sensor.

3. The method of claim 1, wherein:
    when the sensor is started for a first time, a factory programmed phase offset value is used to generate the output signal of the sensor until the value of the average phase offset is calculated; and
    the value of the average phase offset is calculated and stored in the non-volatile memory when the sensor is started for the first time.

4. The method of claim 1, wherein the calculated value of the average phase offset is stored in the non-volatile memory only when a temperature associated with the sensor is below a threshold temperature.

5. The method of claim 1, wherein using the copy of the calculated value of the average phase offset to generate the output signal of the sensor includes:
    generating a virtual signal by shifting the first signal based on the calculated value of the average phase offset; and
    generating a pulse when each of the first signal, the second signal, and the virtual signal falls below a predetermined threshold.

6. The method of claim 1, further comprising calculating a difference between the calculated value of the average phase offset and a phase offset value that is currently stored in the non-volatile memory, wherein the calculated value of the average offset is stored in the non-volatile memory when the difference is greater than a predetermined threshold.

7. The method of claim 1, wherein each of the first and second magnetic field sensing elements includes a giant magnetoresistance (GMR) element or a Hall element, and the output signal is indicative of speed of rotation of the target.

8. The method of claim 1, wherein calculating each of the plurality of phase offset values includes:
    calculating a first phase of the first signal based on a Fast Fourier Transform of the first signal;
    calculating a second phase of the second signal based on a Fast Fourier Transform of the second signal; and
    calculating a difference between the first phase and a second phase.

9. A sensor, comprising:
    a volatile memory;
    a non-volatile memory;
    one or more first magnetic field sensing elements;
    one or more second magnetic field sensing elements; and
    a processing circuitry that is operatively coupled to the non-volatile memory and the volatile memory, the processing circuitry being configured to:
    calculate a value of an average phase offset between a first signal and a second signal, the first signal and the second signal being generated in response to a magnetic field that is associated with a target, the first signal being generated, at least in part, by the one or more first magnetic field sensing elements, the second signal being generated, at least in part, by the one or more second magnetic field sensing elements, wherein calculating the average phase offset includes calculating a plurality of phase offset values and calculating an average of the phase offset values, each of the phase offset values being indicative of a phase offset between the first signal and the second signal at a different time instant;
    store the calculated value of the average phase offset between the first signal and the second signal at an address in the non-volatile memory; and
    when the sensor is restarted, copy the calculated value of the average phase offset from the address in the non-volatile memory to the volatile memory and use the copy of the calculated value of the average phase offset that is stored in the volatile memory to generate an output signal of the sensor, the output signal of the sensor being indicative of at least one of speed of rotation of the target and/or angular position of the target,
    wherein the value of the average phase offset is calculated and stored as part of an internal calibration routine that is performed by the processing circuitry, the internal calibration routine being performed during normal operation of the sensor, after the sensor is deployed.

10. The sensor of claim 9, wherein storing the calculated value of the average phase offset includes overwriting a factory-programmed phase offset value in the non-volatile memory.

11. The sensor of claim 9, wherein:
when the sensor is started for a first time, a factory programmed phase offset value is used to generate the output signal of the sensor until the value of the average phase offset is calculated; and
the value of the average phase offset is calculated and stored in the non-volatile memory when the sensor is started for the first time.

12. The sensor of claim 9, wherein the calculated value of the average phase offset is stored in the non-volatile memory only when a temperature associated with the sensor is below a threshold temperature.

13. The sensor of claim 9, wherein using the copy of the calculated value of the average phase offset to generate the output signal of the sensor includes:
generating a virtual signal by shifting the first signal based on the calculated value of the average phase offset; and
generating a pulse when each of the first signal, the second signal, and the virtual signal falls below a predetermined threshold.

14. The sensor of claim 9, wherein the processing circuitry is further configured to calculate a difference between the calculated value of the average offset and a phase offset value that is currently stored in the non-volatile memory, and the calculated value of the average offset is stored in the non-volatile memory when the difference is greater than a predetermined threshold.

15. The sensor of claim 9, wherein each of the first and second magnetic field sensing elements includes a giant magnetoresistance (GMR) element or a Hall element, and the output signal is indicative of speed of rotation of the target.

16. The sensor of claim 9, calculating each of the plurality of phase offset values includes:
calculating a first phase of the first signal based on a Fast Fourier Transform of the first signal;
calculating a second phase of the second signal based on a Fast Fourier Transform of the second signal; and
calculating a difference between the first phase and a second phase.

17. A non-transitory medium storing one or more processor-executable instructions, which, when executed by a processing circuitry of a sensor, cause the processing circuitry to perform the operations of:
calculating a value of an average phase offset between a first signal and a second signal, wherein: (i) the first signal is generated, at least in part, by one or more first magnetic field sensing elements in response to a magnetic field, (ii) the second signal is generated, at least in part, by one or more second magnetic field sensing elements in response to the magnetic field, and (iii) the magnetic field is associated with a target, wherein calculating the average phase offset includes calculating a plurality of phase offset values and calculating an average of the phase offset values, each of the phase offset values being indicative of a phase offset between the first signal and the second signal at a different time instant;
storing the calculated value of the average phase offset between the first signal and the second signal at an address in a non-volatile memory of the sensor; and
when the sensor is restarted, copying the calculated value of the average phase offset from the address in the non-volatile memory to an address in a working memory of the sensor and using the copy of the calculated value of the average phase offset that is stored in the working memory of the sensor to generate an output signal of the sensor, the output signal of the sensor being indicative of at least one of speed of rotation of the target and/or angular position of the target,
wherein the one or more first magnetic field sensing elements and the one or more second magnetic field sensing elements are part of the sensor, and the value of the average phase offset is calculated and stored as part of an internal calibration routine that is performed by the processing circuitry of the sensor, the internal calibration routine being performed during operation of the sensor, after the sensor is deployed.

18. The non-transitory medium of claim 17, wherein storing the calculated value of the average phase offset includes overwriting a factory-programmed phase offset value in the non-volatile memory of the sensor.

19. The non-transitory medium of claim 17, wherein:
when the sensor is started for a first time, a factory programmed phase offset value is used to generate the output signal of a sensor until the value of the average phase offset is calculated; and
the value of the average phase offset is calculated and stored in the non-volatile memory when the sensor is started for the first time.

20. The non-transitory medium of claim 17, wherein the calculated value of the average phase offset is stored in the non-volatile memory only when a temperature associated with the sensor is below a threshold temperature.

21. The non-transitory medium of claim 17, wherein using the copy of the calculated value of the average phase offset to generate the output signal of the sensor includes:
generating a virtual signal by shifting the first signal based on the calculated value of the average phase offset; and
generating a pulse when each of the first signal, the second signal, and the virtual signal falls below a predetermined threshold.

22. The non-transitory medium of claim 17, wherein the one or more processor-executable instructions, when executed by the processing circuitry of the sensor, further cause the processing circuitry to calculate a difference between the calculated value of the average offset and a phase offset value that is currently stored in the non-volatile memory, and the average offset is stored in the non-volatile memory when the difference is greater than a predetermined threshold.

23. The method of claim 1, wherein performing the internal calibration routine during the operation of the sensor after the sensor is deployed includes performing the internal calibration routine when the sensor is started for the first time after leaving the factory and/or performing the internal calibration routine periodically while the sensor is being used.

24. The sensor of claim 9, wherein performing the internal calibration routine during the operation of the sensor after the sensor is deployed includes performing the internal calibration routine when the sensor is started for the first time after leaving the factory and/or performing the internal calibration routine periodically while the sensor is being used.

25. The non-transitory medium of claim 17, wherein performing the internal calibration routine during the operation of the sensor after the sensor is deployed includes performing the internal calibration routine when the sensor is started for the first time after leaving the factory and/or performing the internal calibration routine periodically while the sensor is being used.

* * * * *